Patented June 10, 1930

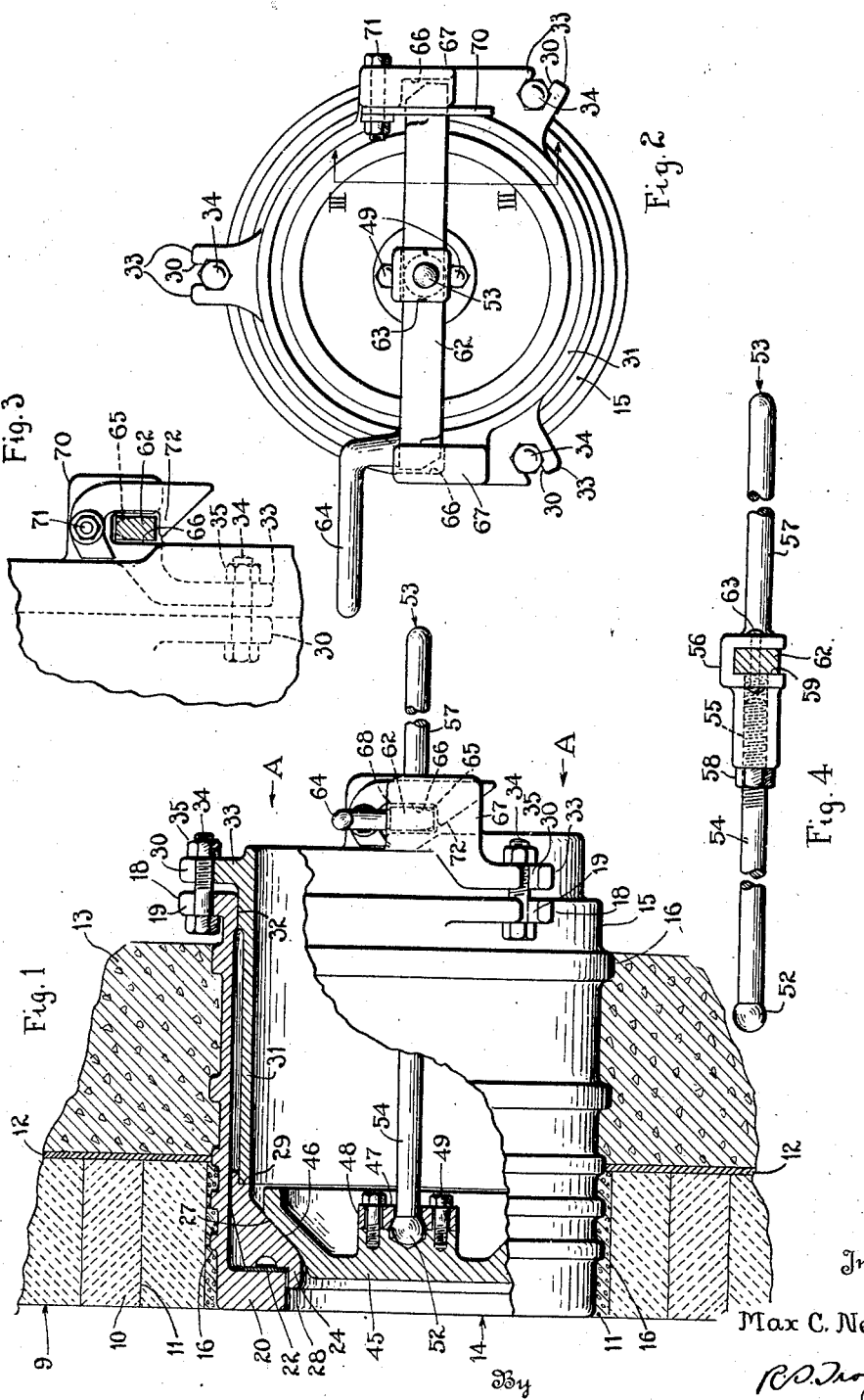

1,763,593

UNITED STATES PATENT OFFICE

MAX C. NELSON, OF AKRON, OHIO, ASSIGNOR TO THE GOODYEAR TIRE & RUBBER COMPANY, OF AKRON, OHIO, A CORPORATION OF OHIO

VALVE FOR ACID TANKS

Application filed February 24, 1928. Serial No. 256,569.

This invention relates to valves and it has particular relation to a valve employed in connection with an acid tank.

One object of the invention is to provide a valve in an acid tank which will permit utilization of the tank substantially continuously.

Another object of the invention is to provide a valve which may be replaced quickly and inexpensively.

Another object of the invention is to provide a novel means for securing the valve disc in its closed position.

In the reclamation of rubber, such as the rubber of worn tires, the parts of the tire at one stage in the process are bathed in acid, such as sulphuric acid, to separate such foreign substances as fabric from the rubber. Hence, acid tanks are employed in which the parts of the tire and the acid are mixed. Ordinarily the inner lining of the tank is constructed of acid proof brick, acid proof cement being employed between the bricks to secure them in position. To form an outlet for the mixture in the tank, a valve is provided at a convenient point, usually adjacent the bottom thereof.

Heretofore, the valve employed comprised a body fastened in the wall of the tank and had a conical opening therein, which received a coacting valve member also of conical shape. Accordingly the valve included only two parts, and when the body member became worn it was necessary to remove it entirely from the wall of the tank. In substituting a new body member, it was necessary to cement it in position with acid proof cement, and because of the relatively long period of time required for drying this cement, the tank could not be utilized for approximately two weeks. Furthermore, much labor and time were required in removing the worn body member of the valve and in replacing it.

This invention obviates to a large extent, the difficulties heretofore encountered, in that a valve has been provided in which the more wearable parts may be refinished or replaced readily and without removing the body of the valve from the wall of the tank. Therefore, it follows that the tank may be utilized substantially continuously. The valve consists principally, of a cylindrical body portion secured in the wall of the tank, a valve seating member removably secured within and to the body portion, a removable disc coacting with the valve seat to close the opening in the body portion, and means for locking the disc in its operative position.

For a better understanding of the invention, references may now be had to the accompanying drawings, forming a part of this specification, in which:—

Fig. 1 is a fragmentary elevational view of a valve constructed according to the invention, showing parts of the valve in cross-section;

Fig. 2 is an end elevational view of the valve taken in the direction indicated by the arrows A—A of Fig. 1;

Fig. 3 is a fragmentary view partly in cross-section, taken substantially along the line III—III of Fig. 2; and Fig. 4 is a fragmentary elevational view of the valve rod.

Referring to Fig. 1, a part of a wall 9 of the acid tank is shown, which comprises an inner layer 10 of acid proof bricks secured together by acid proof cement 11, a coating 12 of asphalt on the outer surfaces of the bricks, and a layer 13 of concrete. A valve 14 in the wall of the tank includes a body portion 15 which is of cylindrical shape and has formed on its outer surface, a plurality of circular ribs 16, which project into the wall of the tank to secure the body portion positively therein.

On the outer end of the body portion 15, a plurality of circumferentially spaced lugs 18 are provided, each of which has a radially extending slot 19 therein. The inner periphery of the body portion at its other end has a circular flange 20, the inner surface of which is plain and is adapted to receive an acid-proof gasket 22, composed of lead, or like material.

Adjacent its inner end portion 15, an annular valve seat 24 rests in gas tight relation against the lead gasket 22. The inner peripheral surface 27 of the valve seat is of conical shape and has a circumferential flange 28 which fits concentrically within the flange 20 to facilitate the proper locating of the valve seat. The outer edge of the valve seat is provided with an annular depression 29 in which one end of a cylindrical member 31 is seated.

This member 31 is disposed axially within the body portion 15, and has a bearing contact therewith, as indicated at 32. On the outer end of the member 31, a plurality of integral lugs 33 are formed, which are similar to the lugs 18 and have slots 30 registering with the slots 19 thereof. The lugs 18 and 33 are secured adjustably together by means of bolts 34 which are disposed in the slots referred to. It will be apparent that by tightening nuts 35 on the bolts, the member 31 is forced against the valve seat 24, which in turn is forced against the flange 20 of the body member 15. This construction prevents the liquid in the tank from flowing between the cylinder and the valve seat.

A valve disc 45 is disposed co-axially within the body portion 15 and has an outer truncated conical surface 46 that engages the conical surface 27. The central portion of the disc 45 is provided with a universal connection 47 that includes a plate 48 bolted, as indicated at 49, thereto, and a spherical portion 52 formed on one end of a sectional rod 53. One section 54 of the rod, upon which the spherical portion 52 is formed, is screw threaded, as indicated at 55, into an enlarged head or block 56 that forms a part of a second section 57. A locking nut 58 threaded upon the section 54 maintains the two sections in their proper operative relation. This construction is provided for varying the distance between the spherical portion 52 and the head 56.

A notch 59 of U-shape is formed transversely in the head 56 and a locking bar 62 is disposed transversely of, and is riveted therein as indicated at 63. This locking bar normally is disposed in a horizontal position and it is provided at one end with a handle 64, integral therewith, by which it may be raised or lowered. Each end of the locking bar is beveled or rounded, as indicated at 65, thereby facilitating the entry thereof into slots 66 formed in lugs or keepers 67 that are diametrically arranged, and integral, with respect to the cylindrical member 31. Each outer edge 68 of the slots may also be beveled or flared further to facilitate movement of the bar 62 therein. Moreover, the curved ends of the bars and the flared portions of the slots cooperate in wedging relation to force the surface 46 tightly against the surface 27. In order that the bar 62 may be locked in the position shown by Fig. 2, a latch 70 is pivoted upon a bolt 71 that is secured to the lug 67 and has a catch 72 engaging the lower side of the bar.

With the parts in their assembled relation as shown by Fig. 1, the valve is in its closed position and accidental opening thereof is prevented by the engagement of the latch with the locking bar. To open the valve, the latch 70 is disengaged from the bar and the bar moved upwardly until it is free from the lugs 38 and 39. Thereafter, the valve disc 45 may be drawn bodily through the cylindrical member 31.

After continued operation, the conical surfaces 27 and 46, on the valve seat 24 and the valve disc 45 respectively, become worn or pitted by acid, and it is necessary to refinish them. Following the refinishing operation, the sections 54 and 57 of the rod 53 are adjusted relatively, to take up any play in the parts caused by the refinishing of said surfaces. Ultimately one or more parts of the valve must be replaced, but it is apparent that this may be done quickly and without great expense.

It will be observed that the valve disc and its supporting structure provides substantially a continuation of the inner wall of the tank, thereby obviating such partially confined spaces or pockets that would be present if the valve disc were positioned adjacent the outer end of the cylindrical member 31.

From the foregoing description it will be apparent that a valve has been provided which is adapted particularly for employment in an acid tank. By providing a plurality of replaceable parts, expense of replacement is reduced materially, because usually only a minor portion needs to be replaced. The adjustability of parts, results in a tight fitting valve and at the same time permits parts of the valve to be refinished without affecting the operation thereof.

Although I have illustrated only the preferred form which my invention may assume and have described that form in detail, it will be apparent to those skilled in the art that the invention is not so limited but that various modifications may be made therein without departing from the spirit of the invention or from the scope of the appended claims.

What I claim is:

1. A valve comprising a cylindrical body having a flange adjacent one end, a valve seat resting on the flange and having a valve seating surface, a cylindrical member within the body and removably secured thereto in abutting relation with the valve seat, said member on its outer end having diametrically disposed keepers and a latch pivoted to one of the keepers, a valve disc resting against the valve seating surface, a rod connected to the disc and extending to the outer end of the cylindrical member, and a bar secured transversely of the rod and turnable into locking engagement with the keepers, the latch being operable to prevent accidental reverse movement of the bar from its locked position.

2. A valve comprising a cylindrical body having a flange adjacent one end, a valve seat resting on the flange and having a valve seating surface, a cylindrical member within the body and removably secured thereto in abutting relation with the valve seat, said member on its outer end having diametrically disposed keepers, a latch pivoted to one of the keepers, a valve disc resting against the valve seating surface, a rod connected to the disc and extending to the outer end of the cylindrical member, and a bar secured to the rod turnable into locking engagement with the keepers, the latch being operable to prevent accidental reverse movement of the bar from its locked position, said bar being adjustably secured to the rod.

3. A valve comprising a cylindrical body having a flange adjacent one end, a valve seat resting on the flange and having a valve seating surface, a cylindrical member within the body and removably secured thereto in abutting relation with the valve seat, said member on its end having diametrically disposed keepers, a latch pivoted to one of the keepers, a valve disc resting against the valve seating surface, a rod connected to the disc and extending to the outer end of the cylindrical member, and a bar secured to the rod and movable into locking engagement with the keepers, the latch being operable to prevent accidental reverse movement of the bar from its locked position, said keepers having beveled surfaces whereby turning of the crank into the keepers also imparts longitudinal movement to the rod.

4. A valve comprising a cylindrical body, a valve seat on the body, diametrically disposed keepers on the body, a valve disc resting against the valve seat, a rod connected to the disc, a member secured transversely of the rod and turnable into locking engagement with the keepers, and a latch pivoted to one of the keepers for positively retaining the member in engagement with the keepers.

5. A valve comprising a cylindrical body having a valve seat, a valve disc within the body adapted to seat upon the valve seat, the end of the cylinder on the side of the disc opposite the valve seat having a diameter greater than that of the disc, a rod connected to the disc, means connecting the rod operatively and adjustably to the cylindrical body, the connecting means comprising a member secured transversely to the rod, keepers on the cylindrical body adapted to receive portions of the member, and a latch movably secured to one of the keepers for retaining the member in engagement therewith.

6. A valve comprising a cylindrical body having a valve seat, a valve disc adapted to seat upon the valve seat, a rod connected to the disc at one end and adjustably connected to a diametrically disposed operating member at its other, and keepers on the cylinder for receiving diametrically disposed portions of the operating member and latching it in its operative position.

7. A valve comprising a cylindrical body having a valve seat, a valve disc adapted to seat upon the valve seat, a rod connected to the disc at one end and adjustably connected to a diametrically disposed operating member at its other, keepers on the cylinder having circumferentially extending slots open at one end for receiving portions of the operating member, and a latch for retaining the member positively in the slots.

In witness whereof, I have hereunto signed my name.

Signed at Akron, in the county of Summit and State of Ohio, U. S. A., this 23rd day of February, 1928.

MAX C. NELSON.